United States Patent
Jadhav et al.

(10) Patent No.: US 11,809,925 B2
(45) Date of Patent: *Nov. 7, 2023

(54) DATA PROCESSING METHOD AND APPARATUS

(71) Applicant: Huawei Technologies Co., Ltd., Shenzhen (CN)

(72) Inventors: Rahul Arvind Jadhav, Shenzhen (CN); K Anmol Mani Tejeswar Sarma, Shenzhen (CN); Zhen Cao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/847,525

(22) Filed: Jun. 23, 2022

(65) Prior Publication Data
US 2022/0327011 A1 Oct. 13, 2022

Related U.S. Application Data

(63) Continuation of application No. 17/097,565, filed on Nov. 13, 2020, now Pat. No. 11,397,627, which is a
(Continued)

(30) Foreign Application Priority Data

Mar. 15, 2019 (CN) .......................... 201910200157.1

(51) Int. Cl.
*G06F 9/54* (2006.01)
*H04L 67/10* (2022.01)
*H04L 67/133* (2022.01)

(52) U.S. Cl.
CPC .............. *G06F 9/547* (2013.01); *H04L 67/10* (2013.01); *H04L 67/133* (2022.05)

(58) Field of Classification Search
CPC . G06F 9/54; G06F 9/541; G06F 9/547; H04L 67/10; H04L 67/40
See application file for complete search history.

(56) References Cited

U.S. PATENT DOCUMENTS

| 10,671,458 B2 * | 6/2020 | Pope ........................ G06F 9/48 |
| 11,397,627 B2 * | 7/2022 | Jadhav .................... H04L 12/28 |

(Continued)

FOREIGN PATENT DOCUMENTS

| CN | 1984152 A | 6/2007 |
| CN | 101159747 A | 4/2008 |

(Continued)

OTHER PUBLICATIONS

Jadhav, R., et al., "Improving syscall batching for network IO," Huawei, 2012 Labs NetdevConf, Prague, Mar. 2019, 26 pages.
(Continued)

*Primary Examiner* — Brian W Wathen
(74) *Attorney, Agent, or Firm* — Conley Rose, P.C.

(57) ABSTRACT

A data processing method and apparatus, where one or more applications run in an operating system of a first device, there is a plurality of paths between the first device and a second device, and the paths correspond to the one or more applications. In a data receiving process, the one or more applications obtain data on the paths through a system call, and further obtain data in a plurality of packets from at least one path. In a data sending process, the one or more applications distribute data to corresponding paths through a system call.

20 Claims, 8 Drawing Sheets

Related U.S. Application Data continuation of application No. PCT/CN2020/078965, filed on Mar. 12, 2020.

(56) References Cited

U.S. PATENT DOCUMENTS

| | | | |
|---|---|---|---|
| 2007/0133582 | A1 | 6/2007 | Banerjee et al. |
| 2010/0115522 | A1 | 5/2010 | Anand et al. |
| 2011/0258337 | A1 | 10/2011 | Wang et al. |
| 2011/0274118 | A1 | 11/2011 | Liu |
| 2011/0292936 | A1 | 12/2011 | Wang et al. |
| 2014/0149781 | A1* | 5/2014 | Horman .............. G06F 11/1415 714/2 |
| 2014/0351431 | A1 | 11/2014 | Li et al. |
| 2016/0162330 | A1 | 6/2016 | Pope et al. |
| 2019/0182364 | A1* | 6/2019 | Dwight ................. H04L 65/611 |
| 2019/0394307 | A1 | 12/2019 | Balasubramanian et al. |

FOREIGN PATENT DOCUMENTS

| | | |
|---|---|---|
| CN | 101304373 A | 11/2008 |
| CN | 101340574 A | 1/2009 |
| CN | 101447925 A | 6/2009 |
| CN | 101494661 A | 7/2009 |
| CN | 101848235 A | 9/2010 |
| CN | 103312625 A | 9/2013 |
| CN | 103841148 A | 6/2014 |
| CN | 103945456 A | 7/2014 |
| CN | 104717189 A | 6/2015 |

OTHER PUBLICATIONS

Majkowski, M., "io_submit: The epoll alternative you've never heard about," retrieved from the internet: https://blog.cloudfare.com/io_submit-the-epoll-alternative-you've-never-heard-about/, Jan. 4, 2019, 13 pages.

"Linux Programmers Manual," RECVMMSG, retrieved from the internet: https://man7.org/linux/manpages/man2/recvmmsg.2.html, Jan. 14, 2018, 5 pages.

"Linux Programmers Manual: SEND(2)," retrieved from the internet: https://Man7.Org/linux/man-pages/man2/sendmsg.2.html, Jan. 16, 2018, 7 pages.

Christensen, M.J., et al.,"Achieving reliable UDP transmission at 10 Gb/s using BSD socket for data acquisition systems," Prepared for submission to JINST, arXiv:1706.00333v2 [physics.ins-det], Apr. 17, 2020, 13 pages.

Soares, L., et al., "FlexSC: Flexible System Call Scheduling with Exception-Less System Calls," Conference: 9th USENIX Symposium on Operating Systems Design and Implementation, OSDI 2010, Oct. 4-6, 2010, Vancouver, BC, Canada, Proceedings, 14 pages.

Carvalho De Melo, A., "recvmmsg Batch datagram processing," Linux Kernel Developers, netconf, Sep. 2009, 11 pages.

Braden, R., Editor, "Requirements for Internet Hosts—Communication Layers," RFC 1122, Oct. 1989, 116 pages.

Zhu, Y., et al., "Trimming the Smartphone Network Stack", In Proceedings of the 15th ACM Workshop on Hot Topics in Networks (HotNets 16). ACM, New York, NY, USA, Nov. 2016, 7 pages.

Stevens, R., et al., "UNIX Network Programming, vol. 1 (3rd)", Nov. 21, 2003, 1094 pages.

\* cited by examiner

I

DATA PROCESSING METHOD AND APPARATUS

CROSS-REFERENCE TO RELATED APPLICATIONS

This is a continuation of U.S. patent application Ser. No. 17/097,565 filed on Nov. 13, 2020, which is a continuation of International Patent Application No. PCT/CN2020/078965 filed on Mar. 12, 2020, which claims priority to Chinese Patent Application No. 201910200157.1 filed on Mar. 15, 2019. All of the aforementioned patent applications are hereby incorporated by reference in their entireties.

TECHNICAL FIELD

Embodiments of this application relate to the field of computer technologies, and in particular, to a data processing method and apparatus.

BACKGROUND

Information is often exchanged between applications of a computer. The application usually runs in an operating system of a device such as a terminal or a server, for example, runs in a user mode of the operating system. Therefore, the application needs to trap into a kernel mode, and read data from kernel space corresponding to the kernel mode or copy to-be-sent data to the kernel space.

The application may be described using a software system architecture such as a client/server (C/S). In this architecture, the client and the server are applications. An application serving as the client requests a service, and an application serving as the server provides the service for the application serving as the client. In some scenarios, the client and the server run on different devices. For example, if an application runs on a terminal, the application is a client, or if an application runs on a server, the application is a server. The client and the server exchange data by establishing a connection. One connection may include a plurality of paths. This connection is referred to as a multipath connection, and a corresponding technology is referred to as a multipath transmission technology. Alternatively, one connection corresponds to one path, for example, a common Transmission Control Protocol (TCP) connection, a User Datagram Protocol (UDP) connection, or a Quick UDP Internet Connections (QUIC). These paths may transmit data based on a Wi-Fi network, a cellular network, BLUETOOTH, or the like. For example, the client and the server use the multipath transmission technology. A plurality of subflows are established between the client and the server. Each subflow corresponds to one path, or each subflow corresponds to one connection. Each path (or connection) corresponds to one pair of socket descriptors, where one socket descriptor is located on a device on which the client is located, and the other socket descriptor is located on a device on which the server is located.

Regardless of receiving data or sending data, an application needs to execute a system call to process the data. For example, after an operating system of a device on which the application is located receives one packet over one path corresponding to the application, the application needs to execute one system call to read data using a socket descriptor corresponding to the path. Correspondingly, each time the application sends data over one path, the application also needs to execute one system call, to indicate, through a socket descriptor corresponding to the path, to-be-sent data to a protocol stack below an application layer. However, one system call generates large overheads. In an actual application scenario, it is very common that one application frequently receives and sends data, one application receives and sends data over a plurality of paths, and a plurality of applications run on one device. Therefore, in a process in which one device exchanges data with another device, frequent system calls occupy many resources. This causes high central processing unit (CPU) utilization of the device and increases power consumption.

SUMMARY

Embodiments of this application provide a data processing method and apparatus, to reduce CPU utilization and power consumption of a device by reducing a quantity of system calls.

According to a first aspect, an embodiment of this application provides a data processing method, where the method is used to process data on a plurality of paths, the plurality of paths are paths between a first device and a second device, the plurality of paths correspond to one or more applications, the one or more applications run in an operating system of the first device, and the method includes receiving, by the operating system of the first device, packets on the plurality of paths, where the packets are from the second device, and after the operating system of the first device receives the packets on the plurality of paths, obtaining, by the one or more applications through only one system call, data respectively corresponding to the one or more applications from data carried in the packets. In this solution, the application running in the operating system of the first device may obtain the data on the plurality of paths through only one system call, and may further obtain, for the plurality of paths, data in a plurality of packets (depending on an amount of data that is received by the plurality of paths in a kernel when the system call is being executed) from at least one path through the system call such that a quantity of system calls is small, and overheads are small. Therefore, CPU utilization and power consumption of the first device can be reduced. In addition, because data in cache space indicated by a plurality of socket descriptors can be simultaneously read through only one system call, data reading efficiency can be improved.

In a feasible design, obtaining, by the one or more applications through only one system call, data respectively corresponding to the one or more applications from data carried in the packets includes obtaining, by the one or more applications by calling a receive function only once, the data respectively corresponding to the one or more applications from the data carried in the packets, where the receive function is a system call interface, and the receive function is used to poll socket descriptors corresponding to two or more paths, to obtain data indicated by the socket descriptors corresponding to the two or more paths. In this method, the one or more applications running in the operating system of the first device manage each socket such that the receive function polls the socket descriptors, to read the data in the packets from cache space indicated by the socket descriptors.

In a feasible design, input of the receive function includes socket descriptors respectively corresponding to the plurality of paths. In this solution, the one or more applications running in the operating system of the first device input the socket descriptors respectively corresponding to the plurality of paths to the receive function such that the receive function polls the socket descriptors, to read the data in the packets from cache space indicated by the socket descriptors.

In a feasible design, the one or more applications execute one system call to poll the socket descriptors respectively corresponding to the plurality of paths, and the operating system of the first device sends first acknowledgement information to the one or more applications, where the first acknowledgement information indicates that the operating system acknowledges that the data respectively corresponding to the one or more applications has been obtained by the one or more applications. For example, the one or more applications running in the operating system of the first device execute the system call to read data from cache space corresponding to a socket descriptor of each path, and the operating system of the first device detects whether data in cache space indicated by each socket descriptor has been successfully read, and generates acknowledgment information for each socket descriptor. Acknowledgement information of all the socket descriptors forms the first acknowledgment information. Acknowledgement information of each socket descriptor is used to indicate whether data in cache space indicated by the socket descriptor has been successfully read.

In a feasible design, at least two of the plurality of paths belong to a same multipath connection. In this solution, because at least two of the plurality of paths belong to a same multipath (MP) connection, in an MP connection implementation scenario, the application can read, through only one system call, data from cache space indicated by socket descriptors of a plurality of paths included in the MP connection.

In a feasible design, the packets on the plurality of paths that are received by the operating system of the first device include at least two packets from a same path. In this solution, there may be a plurality of packets from a same path such that when reading, through one system call, data from cache space indicated by the socket descriptors of the plurality of paths, the application can read data in at least two packets from cache space indicated by a same socket descriptor.

In a feasible design, the one or more applications may bind the socket descriptors of the plurality of paths together and transfer the socket descriptors to the receive function as an array such that the receive function polls the socket descriptors in the array, to read the data in the packets from the cache space indicated by the socket descriptors. Certainly, in addition to the array, another data structure may be used to enable the receive function to learn the socket descriptors. For another example, the socket descriptors of the plurality of paths are sorted in advance, and the receive function reads, based on an order, data from the cache space indicated by the socket descriptors.

In a feasible design, the plurality of paths respectively corresponds to different socket descriptors.

According to a second aspect, an embodiment of this application provides a data processing method, where the method is used to process data on a plurality of paths, the plurality of paths are paths between a first device and a second device, the plurality of paths corresponds to one or more applications, the one or more applications run in an operating system of the first device, and the method includes correspondingly distributing, by the one or more applications, data of the one or more applications to the plurality of paths through only one system call, and sending, by the operating system of the first device, the data to the second device over the plurality of paths. In this solution, the one or more applications running in the operating system of the first device may distribute the data of the one or more applications to corresponding paths through only one system call such that a quantity of system calls is small, and overheads are small. Therefore, CPU utilization and power consumption of the first device can be reduced. In addition, because data can be simultaneously written, through only one system call, to cache space indicated by a plurality of socket descriptors, data writing efficiency can be improved.

In a feasible design, correspondingly distributing, by the one or more applications, data of the one or more applications to the plurality of paths through only one system call includes correspondingly distributing, by the one or more applications, the data of the one or more applications to the plurality of paths by calling a transmit function only once, where the transmit function is a system call interface, and the transmit function is used to poll socket descriptors corresponding to two or more paths, to distribute the data to cache space indicated by the socket descriptors corresponding to the two or more paths. In this solution, the one or more applications running in the operating system of the first device manage each socket such that the transmit function polls the socket descriptors, to write the data of the one or more applications to cache space indicated by the socket descriptors.

In a feasible design, input of the transmit function includes socket descriptors respectively corresponding to the plurality of paths. In this solution, the one or more applications running in the operating system of the first device input the socket descriptors respectively corresponding to the plurality of paths to the transmit function such that the transmit function polls the socket descriptors, to write the data of the one or more applications to cache space indicated by the socket descriptors.

In a feasible design, the operating system of the first device sends second acknowledgment information to the one or more applications, where the second acknowledgment information indicates that the operating system acknowledges that the data respectively corresponding to the one or more applications has been written to the cache space indicated by the socket descriptors respectively corresponding to the plurality of paths. In this solution, the operating system of the first device sends the second acknowledgment information to the one or more applications, and the second acknowledgment information indicates that the operating system determines whether the data respectively corresponding to the one or more applications has been distributed to the paths such that the operating system of the first device manages each application.

In a feasible design, at least two of the plurality of paths belong to a same multipath connection. In this solution, because at least two of the plurality of paths belong to a same MP connection, in an MP connection implementation scenario, the application can write, through only one system call, data to cache space indicated by socket descriptors of a plurality of paths included in the MP connection.

According to a third aspect, an embodiment of this application provides a data processing apparatus, where the apparatus is configured to process data on a plurality of paths, the plurality of paths are paths between a first device and a second device, the plurality of paths correspond to one or more applications, the one or more applications run in an operating system of the first device, and the apparatus includes an operating system configured to receive packets on the plurality of paths, where the packets are from the second device, and an application configured to, after the operating system receives the packets on the plurality of paths, obtain, through only one system call, data respectively corresponding to the one or more applications from data carried in the packets.

In a feasible design, the application is configured to obtain, by calling a receive function only once, the data respectively corresponding to the one or more applications from the data carried in the packets, where the receive function is a system call interface, and the receive function is used to poll socket descriptors corresponding to two or more paths, to obtain data indicated by the socket descriptors corresponding to the two or more paths.

In a feasible design, input of the receive function includes socket descriptors respectively corresponding to the plurality of paths.

In a feasible design, the operating system is further configured to send first acknowledgment information to the one or more applications, where the first acknowledgment information indicates that the operating system acknowledges that the data respectively corresponding to the one or more applications has been obtained by the one or more applications.

In a feasible design, at least two of the plurality of paths belong to a same multipath connection.

In a feasible design, the packets on the plurality of paths that are received by the operating system of the first device include at least two packets from a same path.

According to a fourth aspect, an embodiment of the present disclosure provides a data processing apparatus, where the apparatus is configured to process data on a plurality of paths, the plurality of paths are paths between a first device and a second device, the plurality of paths correspond to one or more applications, the one or more applications run in an operating system of the first device, and the apparatus includes an application configured to correspondingly distribute data of the one or more applications to the plurality of paths through only one system call, and an application system configured to send the data to the second device over the plurality of paths.

In a feasible design, the application is configured to correspondingly distribute the respective data of the one or more applications to the plurality of paths by calling a transmit function only once, where the transmit function is a system call interface, and the transmit function is used to poll socket descriptors corresponding to two or more paths, to distribute the data to cache space indicated by the socket descriptors corresponding to the two or more paths.

In a feasible design, input of the transmit function includes socket descriptors respectively corresponding to the plurality of paths.

In a feasible design, the operating system is further configured to send second acknowledgment information to the one or more applications, where the second acknowledgment information indicates that the operating system acknowledges that the data respectively corresponding to the one or more applications has been written to cache space indicated by the socket descriptors respectively corresponding to the plurality of paths.

In a feasible design, at least two of the plurality of paths belong to a same multipath connection.

According to a fifth aspect, an embodiment of this application provides a computer program product that includes an instruction, and when the instruction is run on a processor, the processor is enabled to perform the method in the first aspect or the possible implementations of the first aspect.

According to a sixth aspect, an embodiment of this application provides a computer program product that includes an instruction, and when the instruction is run on a processor, the processor is enabled to perform the method in the second aspect or the possible implementations of the second aspect.

According to a seventh aspect, an embodiment of this application provides a computer-readable storage medium, the computer-readable storage medium stores an instruction, and when the instruction is run on a processor, the processor is enabled to perform the method in the first aspect or the possible implementations of the first aspect.

According to an eighth aspect, an embodiment of this application provides a computer-readable storage medium, the computer-readable storage medium stores an instruction, and when the instruction is run on a processor, the processor is enabled to perform the method in the second aspect or the possible implementations of the second aspect.

Based on the data processing method and apparatus provided in the embodiments of this application, the one or more applications run in the operating system of the first device, there are the plurality of paths between the first device and the second device, and the plurality of paths correspond to the one or more applications running in the operating system of the first device. In a data receiving process, the application running in the operating system of the first device may obtain the data on the plurality of paths through only one system call, and may further obtain, for the plurality of paths, the data in the plurality of packets from at least one path through the system call. In a data sending process, the data of the one or more applications running in the operating system of the first device may distribute the data of the one or more applications to corresponding paths through only one system call. It may be learned that in the data receiving process or the data sending process, a quantity of system calls in this solution is small, and overheads are small. Therefore, CPU utilization and power consumption of the first device can be reduced. In addition, because data in cache space indicated by a plurality of socket descriptors can be simultaneously read through only one system call, data reading efficiency can be improved.

DESCRIPTION OF EMBODIMENTS

Figure 1A:
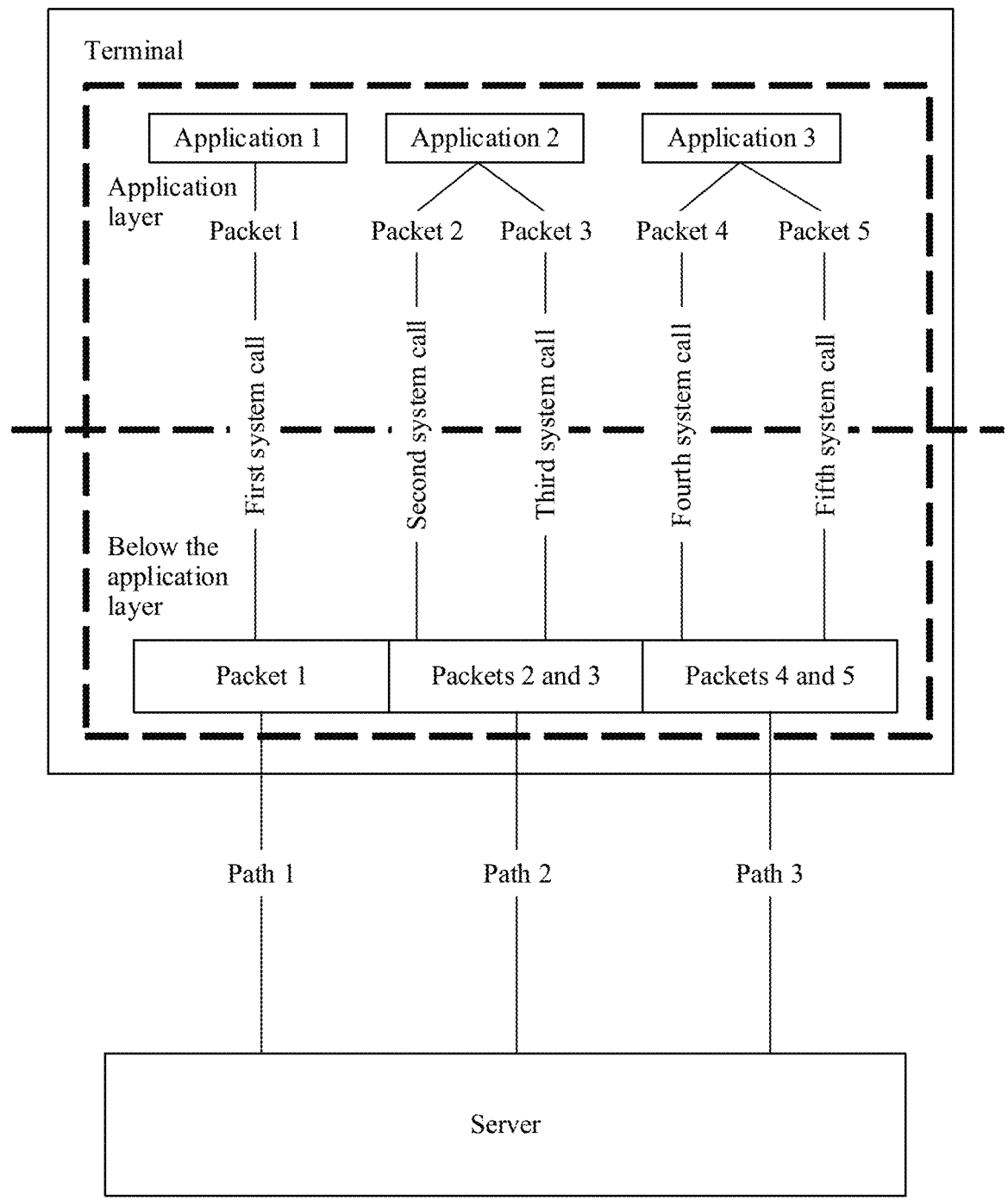
FIG. 1A is a schematic diagram of a process in which an application receives data.

Generally, applications on two devices may exchange data by establishing one or more paths.

A terminal and a server are used as an example. An application running on the terminal is referred to as a client, and an application running on a server is referred to as a server. The client and the server exchange data by establishing a plurality of paths. In a data exchange process, for example, an application is a client on the terminal. In a data receiving process, after data arrives at the terminal, for example, in a kernel mode of an operating system of the terminal, the client needs to execute a system call to read data from the kernel mode, for example, cache space in the kernel mode. When the client corresponds to a relatively large quantity of paths, the client needs to execute a system call for each path, or when the client corresponds to a relatively small quantity of paths, but a data amount on a same path is relatively large, the client also needs to execute a plurality of system calls. Similarly, in a data sending process, the client needs to execute a system call to write data to the kernel mode of the operating system of the terminal, and then can send the data to the server, and a quantity of system calls is related to a quantity of paths corresponding to the client and a data amount on each path. However, relatively large overheads are caused when one system call is executed, and huge overheads are definitely caused when a plurality of system calls are executed. The following describes a reason why overheads are caused when one system call is executed.

For example, the client communicates with the server using a common internet protocol, and the protocol is not implemented by an application, but is implemented by an operating system. A terminal is used as an example. A client on the terminal performs communication using an application interface calling protocol defined by an operating system of the terminal, for example, a Berkeley Software Distribution (BSD) socket application programming interface (API). Generally, the operating system has separate process context, and the operating system usually has two modes: a user mode and a kernel mode. All core services such as a device driver, resource management, and a network protocol that are provided by the operating system run in the kernel mode, and the application runs in the user mode. Virtual addresses managed by the operating system are classified into kernel-mode space and user-mode space. Such classification has significant features in terms of security and fault tolerance, and also simplifies application development. If the client needs to access an operating system (OS) service or exchange data between kernel space and application space, the client needs to use a system call. To execute the system call, control rights need to be transferred from user space to the kernel space. Specific details depend on implementation of the operating system and a CPU architecture instruction set, and may involve saving of an execution status, parameter calculation, interruption generation, and the like. Therefore, execution of the application may be interrupted, a cache may be refreshed, and the like. Therefore, huge overheads are generated when one system call is executed. That the application receives data is used as an example below to describe how the client executes the system call.

FIG. 1A is a schematic diagram of a process in which an application receives data.

Referring to FIG. 1a, a dotted-line box in the figure shows an operating system of a terminal. An application 1, an application 2, and an application 3 run in the operating system of the terminal, and respectively correspond to three paths. The three paths each correspond to one socket descriptor on the terminal: a socket descriptor 1 (S1), a socket descriptor 2 (S2), and a socket descriptor 3 (S3). After a packet 1 sent by a server over a path 1 arrives at the terminal, the packet does not directly arrive at an application at an application layer, but is stored below the application layer, for example, cache space indicated by S1 in kernel space. Similarly, a packet 2 and a packet 3 that are sent by the server over a path 2 arrive at the terminal, and are stored in cache space indicated by S2, and a packet 4 and a packet 5 that are sent by the server over a path 3 arrive at the terminal, and are stored in cache space indicated by S3. Each time a packet arrives at the terminal over a path, the terminal triggers the application at the application layer to execute a system call to read the packet from cache space indicated by a socket descriptor of the path. For example, if the packet 1 to the packet 5 arrive at the terminal successively, the application executes a first system call to read the packet 1 from the cache space indicated by S1, the application executes a second system call to read the packet 2 from the cache space indicated by S2, the application executes a third system call to read the packet 3 from the cache space indicated by S2, the application executes a fourth system call to read the packet 4 from the cache space indicated by S3, and the application executes a fifth system call to read the packet 5 from the cache space indicated by S3. In this process, five system calls are executed in total.

To avoid high CPU utilization and high power consumption of the terminal that are caused due to an excessive quantity of system calls, it is considered to execute one system call to read two or more packets. For example, FIG. 1B is a schematic diagram of another process in which an application receives data.

Figure 1B:
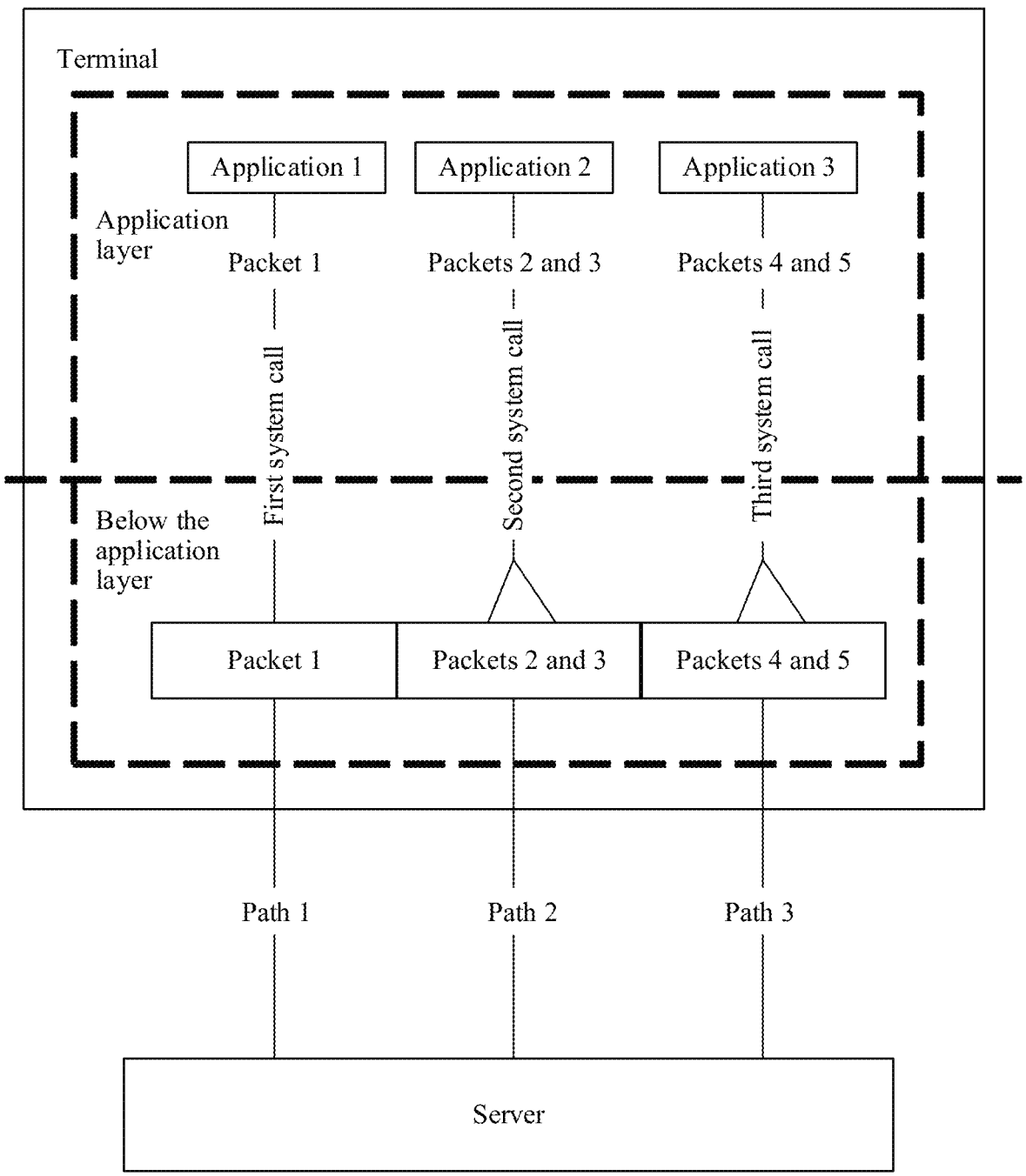
FIG. 1B is a schematic diagram of another process in which an application receives data.

Referring to FIG. 1B, after arriving at the terminal, the packet 1 to the packet 5 that are sent by the server are separately stored in the cache space indicated by S1, S2, and S3. It is assumed that the packet 1 to the packet 5 arrive at the terminal successively, a time interval between receiving the packet 2 and the packet 3 over the path 2 is small enough, and a time interval between receiving the packet 4 and the packet 5 over the path 3 by the terminal is small enough. The application executes a first system call to read the packet 1 from the cache space indicated by S1, executes a second system call to read the packet 2 and the packet 3 from the cache space indicated by S2, and executes a third system call to read the packet 4 and the packet 5 from the cache space indicated by S3. In this process, three system calls are executed in total. In this process, a time interval between a plurality of packets read during one system call needs to be small enough.

In the foregoing manner of executing one system call to read a plurality of packets, a quantity of system calls can be reduced to some extent. However, if a time interval of packets on a path is not small enough, a plurality of packets cannot be read if one system call is executed for the path, and finally, a plurality of system calls still need to be executed to read the plurality of packets. A typical scenario is a cloud scenario. In this scenario, an application runs on the terminal, bandwidth from the terminal to a cloud server is generally relatively small, and a throughput is not very high. A plurality of packets cannot be read if one system call is executed for one path, and consequently, an objective of reducing CPU utilization and power consumption of the terminal by reducing a quantity of system calls cannot be achieved.

In view of this, an embodiment of this application provides a data processing method, to reduce CPU utilization and power consumption of a device by reducing a quantity of system calls.

Figure 2:
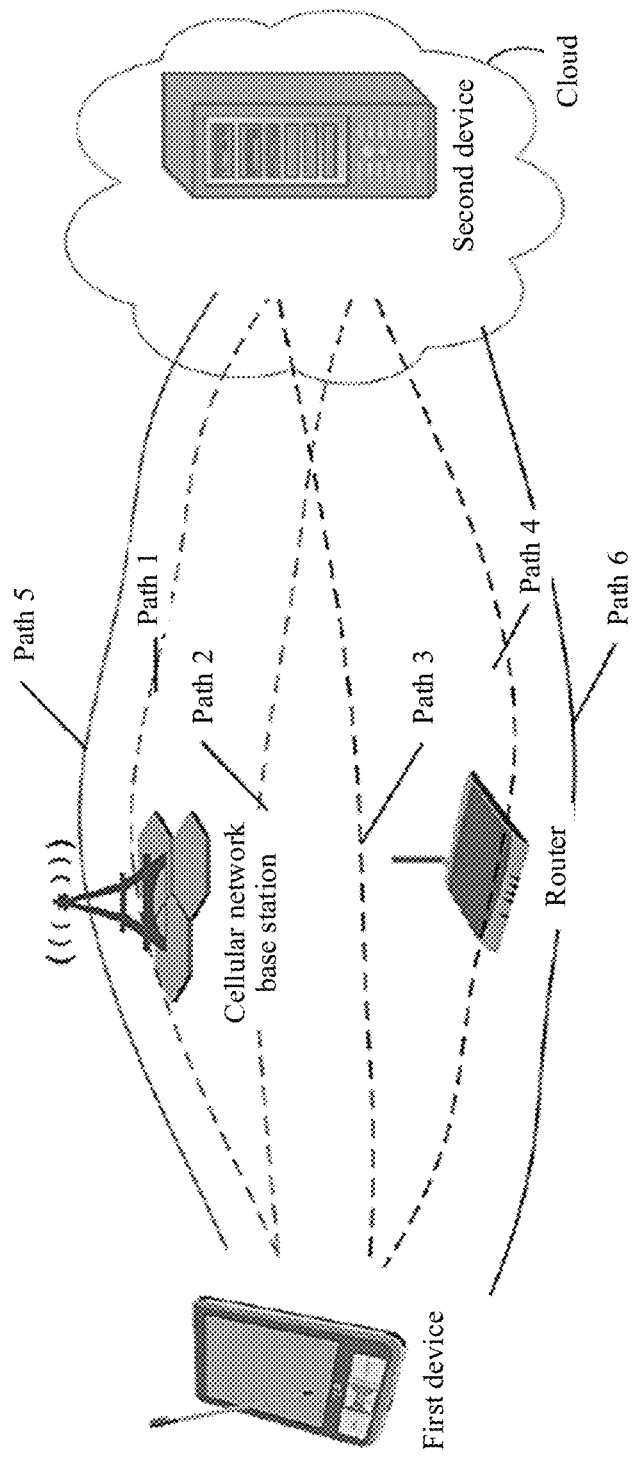
FIG. 2 is a schematic diagram of a network architecture to which an embodiment of this application is applicable.

FIG. 2 is a schematic diagram of a network architecture to which an embodiment of this application is applicable. Referring to FIG. 2, the architecture includes at least one first device, a second device, access nodes of different networks, and the like. The first device is, for example, a user equipment (UE), a handheld terminal, a notebook computer, a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, or another device that can access a network. The first device communicates with the access node using an air interface technology. One or more applications run on the first device.

The second device may be, for example, a server such as a service server or a proxy server, and may provide a service for the one or more applications running on the first device. The one or more applications on the first device may be referred to as a client, and the service provided by the second device may be referred to as a server.

The access node is an access node of a wireless network. The access node may be an access point (AP) of a wireless Wi-Fi network, a router, an access point of a Worldwide Interoperability for Microwave Access (WiMAX) network, a base station of a wireless cellular mobile network, or the like. A type of the wireless network and a specific form of the access node of the wireless network are not limited in the present disclosure. In addition, wireless networks of a same type are access nodes that belong to the wireless Wi-Fi network or the WIMAX network, or access nodes that belong to the wireless cellular network such as a second generation (2G) network, a third generation (3G) network, a fourth generation (4G) network, or a fifth generation (5G) network.

Referring to FIG. 2, in this embodiment of this application, both the first device and the second device support Wi-Fi and the cellular network. One or more applications run in an operating system of the first device, and the second device is configured to provide a service for the one or more applications running on the first device. The first device and the second device may exchange data using a multipath transmission technology and/or a single-path transmission technology.

When the one or more applications of the first device exchange data with the second device using the multipath transmission technology, one connection established between the two devices may include a plurality of paths. One MP connection is established based on the Wi-Fi network and the cellular network. The MP connection includes four paths. As shown by dotted lines in FIG. 2, the MP connection includes a path 1, a path 2, a path 3, and a path 4. The path 1 and the path 2 transmit data based on the cellular network, and the path 3 and the path 4 transmit data based on the Wi-Fi network.

When the one or more applications of the first device exchange data with the second device using the single-path transmission technology, one connection established between the two devices includes only one path. For example, the path is a path 5 or a path 6 shown by a solid line in the figure, the path 5 transmits data based on the cellular network, and the path 6 transmits data based on the Wi-Fi network. The single-path transmission technology may use a plurality of transmission protocols, such as a TCP, a UDP, and a QUIC.

Referring to FIG. 2, in this embodiment of this application, the first device may receive a packet from the second device over the foregoing path (including at least one of the paths of the MP connection and the path of the single-path transmission technology), and data in the packet is data corresponding to the one or more applications running on the first device. Alternatively, the first device may package data corresponding to the one or more applications into a packet, and send the packet to the second device over the foregoing path.

It should be noted that, although the network architecture in this embodiment of this application is described in detail above using an application running on the first device as a client and a service provided on the second device as a server, this is not limited in this embodiment of this application. For example, in another feasible implementation, the first device may also be a server, and the second device may be a terminal.

Some names in the embodiments of this application are explained and described below.

A and/or B indicates A and B, or A or B.

Data processing may be data processing in a data receiving process, or may be data processing in a data sending process. In the data receiving process, data processing includes, after an operating system of a first device receives packets on a plurality of paths, each application running on the first device obtains, through only one system call, data that is in data carried in the packets and that respectively corresponds to one or more applications. In the data sending process, data processing includes each application running on the first device distributes data of the one or more applications to the paths through only one system call.

A connection may be at least one of an 1VIP connection and a connection of a single-path transmission technology.

An 1VIP connection is a connection that includes a plurality of paths. For example, in this application, one end node of the MP connection is the first device, and the other end node is a second device. One or more applications run on the first device, and there is a one-to-one mapping relationship between the 1VIP connection and a socket descriptor (socket) of the application.

Connection of the single-path transmission technology: Compared with the MP connection, the connection of the single-path transmission technology includes only one path.

Path: The path is a link between a sender and a receiver. The path may be identified by a 4-tuple or a 5-tuple. For example, the 5-tuple includes a source Internet Protocol (IP) address, a source port number, a destination IP address, a destination port number, and a transport layer protocol name. A plurality of paths between one receiver and one transmitter may share one or more routers. The path in the embodiments of this application includes a path in the MP connection and/or a path in the connection of the single-path transmission technology. A stream transmitted on the path may use a TCP, a UDP, a Stream Control Transmission Protocol (SCTP), a QUIC, or the like.

The application runs on the first device, and there may be one or more applications. The one or more applications may perform data processing through only one system call. The application is, for example, a launcher, a media player, or a browser.

The system call means that the application performs context switching once, or may be understood as that the application performs trap-in and trap-out once. For example, the operating system usually has two modes: a user mode and a kernel mode. The first device is used as an example. After the first device receives a packet, the packet does not directly arrive at user space corresponding to the user mode, but is stored in kernel space corresponding to the kernel mode. The application needs to trap into the kernel mode of the operating system, read the packet from the kernel space to the user space, and then the application traps out to enter the user mode of the operating system. In a packet sending process, the application also needs to trap into the kernel mode from the user mode, copy a to-be-sent packet from the user space to the kernel space, and then, the application traps out to enter the user mode of the operating system. For another example, when the operating system of the first device does not distinguish context space, the first device also needs to execute the system call to process data.

A socket descriptor is a pointer and is an abbreviation of a socket file descriptor. In the embodiments of this application, one path corresponds to one pair of socket descriptors that are respectively located at two ends of the path, and one socket descriptor indicates one segment of cache space. For example, for a corresponding terminal, one socket indicator indicates a segment of cache space in kernel space of an operating system of the terminal.

The following describes in detail the data processing method in the embodiments of this application on the basis of the foregoing architecture shown in FIG. 2.

Figure 3:
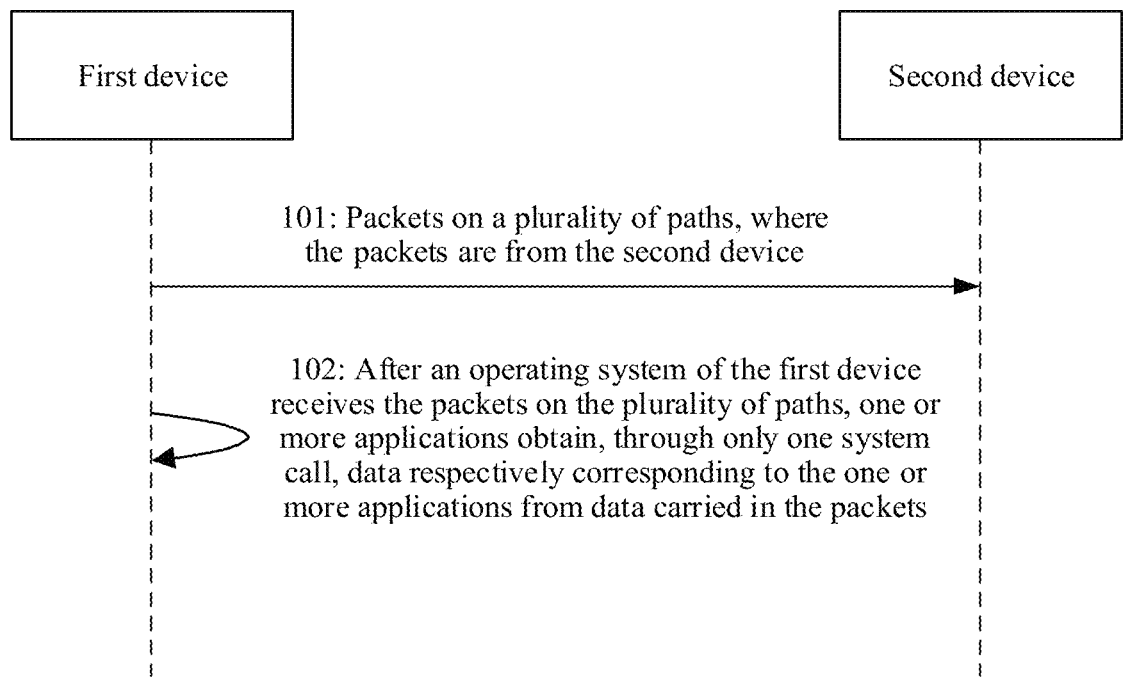
FIG. 3 is a flowchart of a data processing method according to an embodiment of this application.

FIG. 3 is a flowchart of a data processing method according to an embodiment of this application. In this embodiment, how an application running on a first device processes packets in a data receiving process after the packets sent by a second device over a plurality of paths arrive at the first device is described in detail. This embodiment includes the following steps.

101: An operating system of the first device receives packets on the plurality of paths, where the packets are from the second device.

For example, one or more applications run in the operating system of the first device, a plurality of paths are established between the first device and the second device, the plurality of paths include a path in an MP connection and/or a path in a connection of a single-path transmission technology, and the plurality of paths correspond to the one or more applications running in the operating system of the first device. For example, referring to FIG. 2, the plurality of paths includes paths 1 to 6. The paths 1 to 4 are paths included by an MP connection, the path 5 is a path in a connection of the single-path transmission technology, and the path 6 is a path in another connection of the single-path transmission technology. An application 1 runs in the operating system of the first device, and all the six paths correspond to the application 1. It should be understood that there may be another application in the first device, and the first device may alternatively be an end node of another path, but the other path is not shown. That is, the plurality of paths may not be all paths maintained by the first device. For another example, an application 1, an application 2, and an application 3 run in the operating system of the first device, the path 1 and the path 2 correspond to the application 1, the path 3 and the path 5 correspond to the application 2, and the path 4 and the path 6 correspond to the application 3. Certainly, all the plurality of paths may be paths in a common single-path connection, that is, the paths 1 to 6 each correspond to one application.

When sending the packets to the first device, the second device sends the packets to the first device over the foregoing plurality of paths. Correspondingly, the operating system of the first device receives the packets. The foregoing example is still used. The second device sends a packet 1 to the first device over the path 1, sends a packet 2 and a packet 3 to the first device over the path 2, sends a packet 4, a packet 5, and a packet 6 to the first device over the path 3, sends a packet 7 to the first device over the path 4, sends a packet 8 to the first device over the path 5, and sends a packet 9 to the first device over the path 6. Correspondingly, the operating system of the first device receives the packets that pass through the paths.

102: After the operating system of the first device receives the packets on the plurality of paths, the one or more applications obtain, through only one system call, data respectively corresponding to the one or more applications from data carried in the packets.

For example, each path corresponds to one socket descriptor on the second device. The socket descriptor is essentially a pointer, and each socket descriptor may indicate one cache space. After receiving the packets, an operating system of the second device stores the packets in cache space indicated by socket descriptors of the paths. For example, the packet 1 is stored in storage space indicated by a socket descriptor of the path 1, the packet 2 and the packet 3 are stored in storage space indicated by a socket descriptor of the path 2, the packet 4, the packet 5, and the packet 6 are stored in storage space corresponding to a socket descriptor of the path 4, . . . .

Then, the one or more applications execute only one system call, that is, the application traps into a kernel mode, to obtain the data respectively corresponding to the one or more applications from the data carried in the packets. For example, each of the six paths corresponds to the application 1 running in the operating system of the first device, and in this case, one system call is performed, and the application 1 obtains data from the packet 1 to the packet 9. For another example, the application 1, the application 2, and the application 3 run in the operating system of the first device, the path 1 and the path 2 correspond to the application 1, the path 3 and the path 5 correspond to the application 2, and the path 4 and the path 6 correspond to the application 3, and in this case, the application 1, the application 2, and the application 3 execute one system call, the application 1 obtains data from the packet 1 to the packet 3, the application 2 obtains data from the packet 4, the packet 5, the packet 6, and the packet 8, and the application 3 obtains data from the packet 7 and the packet 9.

According to the data processing method provided in this embodiment of this application, the one or more applications run in the operating system of the first device, there are the plurality of paths between the first device and the second device, and the plurality of paths correspond to the one or more applications running in the operating system of the first device. After the operating system of the first device receives the packets sent by the second device over the plurality of paths, the one or more applications running in the operating system of the first device obtain, through only one system call, the data respectively corresponding to the one or more applications from the data carried in the packets. In this process, the application running in the operating system of the first device may obtain the data on the plurality of paths through only one system call, and may further obtain, for the plurality of paths, data in a plurality of packets (depending on an amount of data that is received by the plurality of paths in a kernel when the system call is being executed) from at least one path through the system call such that a quantity of system calls is small, and overheads are small. Therefore, CPU utilization and power consumption of the first device can be reduced. In addition, because data in cache space indicated by a plurality of socket descriptors can be simultaneously read through only one system call, data reading efficiency can be improved.

In the foregoing embodiment, to enable each application to determine, during the system call, a packet from which data is to be read, each packet from the second device carries an application identifier. In this case, when executing the system call, each application may determine a packet from which an application needs to read data. Alternatively, the operating system of the first device pre-defines a correspondence between the path and the application, and maintains the correspondence. In this case, when executing the system call, each application may determine, based on the correspondence, a packet from which an application needs to read data.

In a feasible design, when the one or more applications obtain, through only one system call, the data respectively corresponding to the one or more applications from the data carried in the packets, the one or more applications obtain, by calling a receive function only once, the data respectively corresponding to the one or more applications from the data carried in the packets. The receive function is a system call interface, and the receive function is used to poll socket descriptors corresponding to two or more paths, to obtain data indicated by the socket descriptors corresponding to the two or more paths.

For example, the one or more applications may bind socket descriptors of the plurality of paths together and transfer the socket descriptors to the receive function as an array such that the receive function polls the socket descriptors in the array, to read the data in the packets from cache space indicated by the socket descriptors. Certainly, in addition to the array, another data structure may be used to enable the receive function to learn the socket descriptors. For another example, the socket descriptors of the plurality of paths are sorted in advance, and the receive function reads, based on an order, data from the cache space indicated by the socket descriptors.

Figure 4:
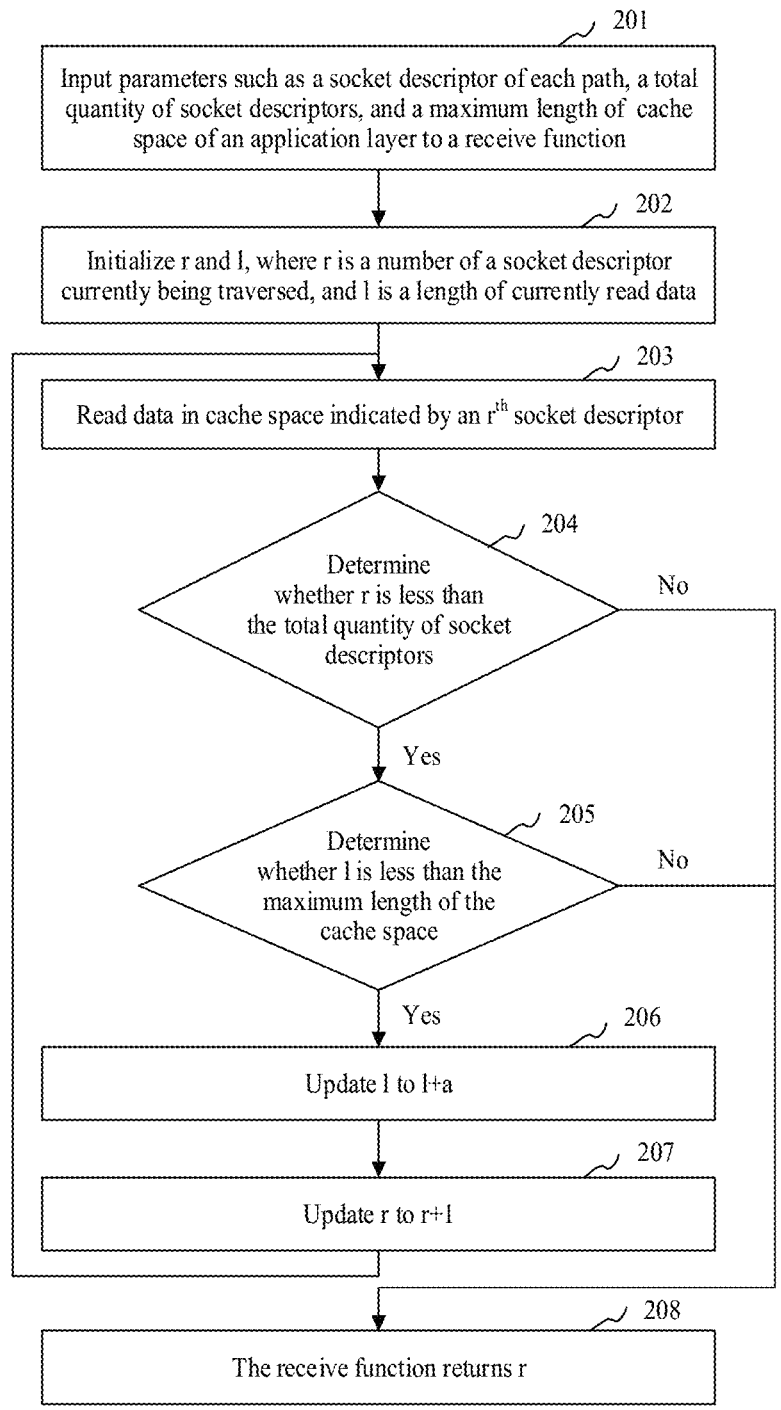
FIG. 4 is a flowchart of polling, by a receive function, a socket descriptor of each path in a data processing method according to an embodiment of this application.

For example, FIG. 4 is a flowchart of polling, by a receive function, a socket descriptor of each path in a data processing method according to an embodiment of this application. In this embodiment, the receive function is set to recvmmmsg( ) a total quantity of socket descriptors is recorded as epcnt, and a current socket descriptor is an $r^{th}$ socket descriptor. In a system calling process, data read by an application is stored in cache space of an application layer, and a maximum length of the cache space is vlen. This embodiment includes the following steps.

201: Input parameters such as a socket descriptor of each path, the total quantity of socket descriptors, and the maximum length of the cache space of the application layer to the receive function.

202: Initialize r and l, where r is a number of a socket descriptor currently being traversed, and l is a length of currently read data.

203: Read data in cache space indicated by the $r^{th}$ socket descriptor.

204: Determine whether r is less than the total quantity epcnt of socket descriptors, and if r is less than the total quantity epcnt of socket descriptors, perform step 205, or if r is greater than or equal to the total quantity of socket descriptors epcnt, perform step 208.

205: Determine whether l is less than the maximum length vlen of the cache space, and if l is less than the maximum length vlen of the cache space, perform step 206, or if l is greater than or equal to the maximum length vlen of the cache space, perform step 208.

206: Update l to l+a, and then perform step 207, where a is a length of the data read in step 203.

207: Update r to r+1, and then perform step 203.

208: The receive function returns r.

In this embodiment, the one or more applications running in the operating system of the first device manage each socket such that the receive function polls the socket descriptors, to read the data in the packets from cache space indicated by the socket descriptors.

In a feasible design, input of the receive function includes socket descriptors respectively corresponding to the plurality of paths.

For example, when the one or more applications execute one system call, the one or more applications input the socket descriptors respectively corresponding to the plurality of paths to the receive function. For example, the socket descriptors respectively corresponding to the plurality of paths are bound as an array and input to the receive function. For another example, the one or more applications directly input the socket descriptors respectively corresponding to the plurality of paths to the receive function.

During implementation, the one or more applications running in the operating system of the first device input the socket descriptors respectively corresponding to the plurality of paths to the receive function such that the receive function polls the socket descriptors, to read the data in the packets from cache space indicated by the socket descriptors.

In a feasible design, the one or more applications execute one system call to poll the socket descriptors respectively corresponding to the plurality of paths, and the operating system of the first device sends first acknowledgement information to the one or more applications, where the first acknowledgement information indicates that the operating system acknowledges that data respectively corresponding to the one or more applications has been obtained by the one or more applications. For example, the one or more applications running in the operating system of the first device execute the system call to read data from cache space corresponding to a socket descriptor of each path, and the operating system of the first device detects whether data in cache space indicated by each socket descriptor has been successfully read, and generates acknowledgment information for each socket descriptor. Acknowledgement information of all the socket descriptors forms the first acknowledgment information. Acknowledgement information of each socket descriptor is used to indicate whether data in cache space indicated by the socket descriptor has been successfully read.

In this embodiment, the operating system of the first device sends the first acknowledgment information to the one or more applications, and the first acknowledgment information indicates that the operating system determines whether the data respectively corresponding to the one or more applications has been obtained by the one or more applications such that the operating system of the first device manages each application.

In a feasible design, at least two of the plurality of paths belong to a same multipath connection.

For example, still referring to FIG. 2, in the paths 1 to 6, the paths 1 to 4 belong to a same multipath connection.

In this embodiment, because at least two of the plurality of paths belong to a same MP connection, in an MP connection implementation scenario, the application can read, through only one system call, data from cache space indicated by socket descriptors of a plurality of paths included in the MP connection.

In a feasible design, the packets on the plurality of paths that are received by the operating system of the first device include at least two packets from a same path.

For example, still referring to FIG. 2, the second device sends a packet 1 to the first device over the path 1, sends a packet 2 and a packet 3 to the first device over the path 2, sends a packet 4, a packet 5, and a packet 6 to the first device over the path 3, sends a packet 7 to the first device over the path 4, sends a packet 8 to the first device over the path 5, and sends a packet 9 to the first device over the path 6. Correspondingly, the operating system of the first device receives the packets that pass through the paths. The packet 2 and the packet 3 are from a same path, that is, the path 2, and the packet 4, the packet 5, and the packet 6 are from a same path, that is, the path 3.

In this embodiment, there may be a plurality of packets from a same path such that when reading, through one system call, data from cache space indicated by the socket descriptors of the plurality of paths, the application can read data in at least two packets from cache space indicated by a same socket descriptor.

Figure 5:
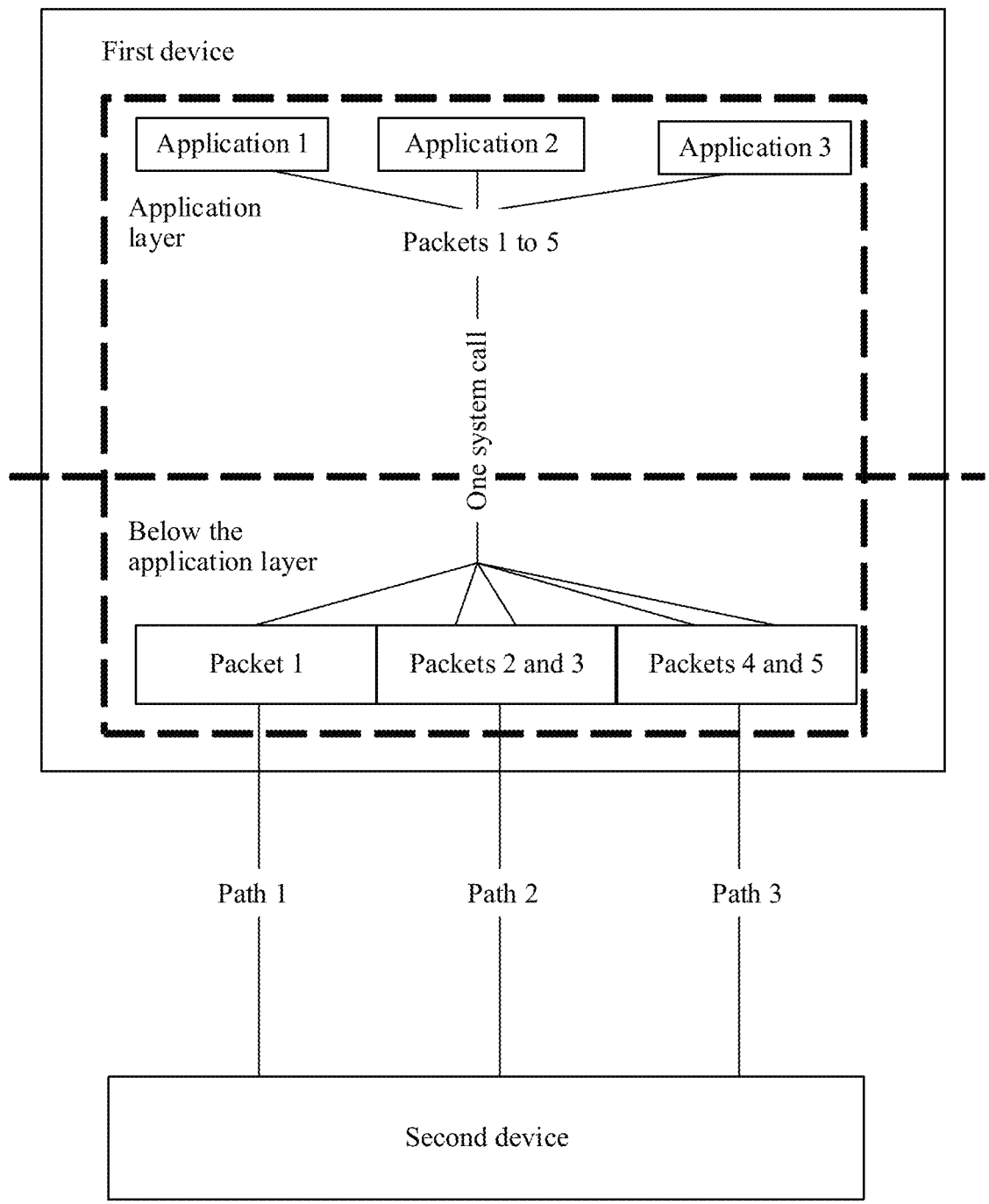
FIG. 5 is a schematic diagram of receiving data by an application in a data processing method according to an embodiment of this application.

FIG. 5 is a schematic diagram of receiving data by an application in a data processing method according to an embodiment of this application. Referring to FIG. 5, in this embodiment, a first device is a first device, a second device is a second device, a dotted-line box in the figure shows an operating system of the first device, and an application 1, an application 2, and an application 3 run in the operating system of the first device and respectively correspond to three paths. The three paths each correspond to one socket descriptor on the first device: a socket descriptor 1 (S1), a socket descriptor 2 (S2), and a socket descriptor 3 (S3). After a packet 1 sent by a server over the path 1 arrives at the first device, the packet is received by the operating system of the first device, and does not directly arrive at an application at an application layer, but is stored by the operating system of the first device in cache space indicated by S1 below the application layer. Similarly, a packet 2 and a packet 3 that are sent by the server over the path 2 arrive at the first device and are stored by the operating system of the first device in cache space indicated by S2, and a packet 4 and a packet 5 that are sent by the server over the path 3 arrive at the first device and are stored by the operating system of the first device in cache space indicated by S3.

Then, an application running in the operating system of the first device executes one system call to read the packet 1 to the packet 5 from cache space indicated by respective socket descriptors of the path 1, the path 2, and the path 3, to obtain data of the application.

Figure 6:
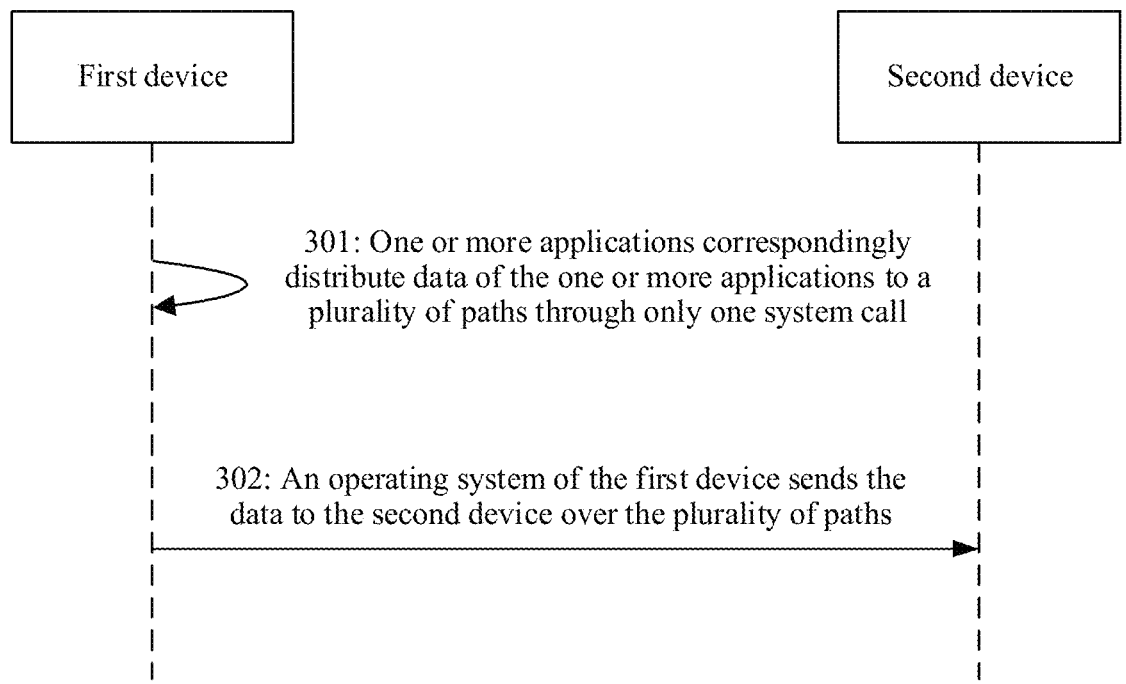
FIG. 6 is a flowchart of another data processing method according to an embodiment of this application.

FIG. 6 is a flowchart of another data processing method according to an embodiment of this application. In this embodiment, how an application running on a first device distributes, in a data sending process, data to be sent to a second device to a plurality of paths is described in detail. This embodiment includes the following steps.

301: One or more applications correspondingly distribute data of the one or more applications to the plurality of paths through only one system call.

For example, one or more applications run in an operating system of the first device, a plurality of paths are established between the first device and the second device, the plurality of paths include a path in an MP connection and/or a path in a connection of a single-path transmission technology, and the plurality of paths correspond to the one or more applications running in the operating system of the first device. For example, referring to FIG. 2, the plurality of paths includes paths 1 to 6. The paths 1 to 4 are paths included by an MP connection, the path 5 is a path in a connection of the single-path transmission technology, and the path 6 is a path in another connection of the single-path transmission technology. An application 1 runs in the operating system of the first device, and all the six paths correspond to the application 1. For another example, an application 1, an application 2, and an application 3 run in the operating system of the first device, the path 1 and the path 2 correspond to the application 1, the path 3 and the path 5 correspond to the application 2, and the path 4 and the path 6 correspond to the application 3.

When sending data to the second device, the one or more applications running in the operating system of the first device first determines a path corresponding to each piece of to-be-sent data. Then, the one or more applications write the data to storage space indicated by a socket descriptor of each path through only one call. This process is also referred to as correspondingly distributing the data to each path.

302: The operating system of the first device sends the data to the second device over the plurality of paths.

For example, the paths may transmit data based on a Wi-Fi network, a cellular network, or BLUETOOTH. Therefore, the operating system of the first device may send data to the second device over a plurality of paths.

For example, referring to FIG. 2, the application 1 runs in the operating system of the first device, and all the six paths correspond to the application 1. The application 1 determines to send a packet a to the second device over the path 1, send a packet b and a packet c to the second device over the path 2, send a packet d, a packet e, and a packet f to the second device over the path 3, send a packet g to the second device over the path 4, send a packet h to the second device over the path 5, and send a packet i to the second device over the path 6. Through only one system call, the application 1 writes the packet a to cache space indicated by a socket descriptor of the path 1, writes the packet b and the packet c to cache space indicated by a socket descriptor of the path 2, writes the packet d, the packet e, and the packet f to cache space indicated by a socket descriptor of the path 3, writes the packet g to cache space indicated by a socket descriptor of the path 4, writes the packet h to cache space indicated by a socket descriptor of the path 5, and writes the packet i to cache space indicated by a socket descriptor of the path 6. Then, the operating system of the first device sends the packet a to the packet i to the second device over the paths 1 to 6.

For another example, an application 1, an application 2, and an application 3 run in the operating system of the first device, the path 1 and the path 2 correspond to the application 1, the path 3 and the path 5 correspond to the application 2, and the path 4 and the path 6 correspond to the application 3. The application 1 determines to send a packet a to the second device over the path 1, and send a packet b and a packet c to the second device over the path 2, the application 2 determines to send a packet d, a packet e, and a packet f to the second device over the path 3, and send a packet h to the second device over the path 5, and the application 3 determines to send a packet g to the second device over the path 4, and send the packet i to the second device over the path 6. Through only one system call, the application 1, the application 2, and the application 3 write the packet a to cache space indicated by a socket descriptor of the path 1, write the packet b and the packet c to cache space indicated by a socket descriptor of the path 2, write the packet d, the packet e, and the packet f to cache space indicated by a socket descriptor of the path 3, write the packet g to cache space indicated by a socket descriptor of the path 4, write the packet h to cache space indicated by a socket descriptor of the path 5, and write the packet i to cache space indicated by a socket descriptor of the path 6.

Then, the operating system of the first device sends the packet a to the packet i to the second device over the paths 1 to 6.

According to the data processing method provided in this embodiment of this application, the one or more applications run in the operating system of the first device, there are the plurality of paths between the first device and the second device, and the plurality of paths correspond to the one or more applications running in the operating system of the first device. The one or more applications running in the operating system of the first device correspondingly distribute the data of the one or more applications to the plurality of paths through only one system call, and then, the operating system of the first device sends the data to the second device over the plurality of paths. In this process, the one or more applications running in the operating system of the first device may distribute the data of the one or more applications to corresponding paths through only one system call such that a quantity of system calls is small, and overheads are small. Therefore, CPU utilization and power consumption of the first device can be reduced. In addition, because data can be simultaneously written, through only one system call, to cache space indicated by a plurality of socket descriptors, data writing efficiency can be improved.

In the foregoing embodiment, in a data sending process, same data may be sent on different paths. For example, an application 1 runs in the operating system of the first device, the application 1 is to send data 1, data 2, and data 3 to the second device, and the application corresponds to the path 1, the path 2, and the path 3. Through only one system call, the application 1 distributes the data 1 and the data 2 to the path 1, distributes the data 3 to the path 2, and distributes the data 1, the data 2, and the data 3 to the path 3, to send same data on different paths.

In a feasible design, that the one or more applications correspondingly distribute data of the one or more applications to the plurality of paths through only one system call includes correspondingly distributing, by the one or more applications, the data of the one or more applications to the plurality of paths by calling a transmit function only once, where the transmit function is a system call interface, and the transmit function is used to poll socket descriptors corresponding to two or more paths, to distribute the data to cache space indicated by the socket descriptors corresponding to the two or more paths.

For example, the one or more applications may bind socket descriptors of the plurality of paths together and transfer the socket descriptors to the transmit function as an array such that the transmit function polls the socket descriptors in the array, to write the data to the cache space indicated by the socket descriptors. For another example, the socket descriptors of the plurality of paths are sorted in advance, and the transmit function writes, based on an order, the data of the one or more applications to the cache space indicated by the socket descriptors.

In this embodiment, the one or more applications running in the operating system of the first device manage each socket such that the transmit function polls the socket descriptors, to write the data of the one or more applications to cache space indicated by the socket descriptors.

In a feasible design, input of the transmit function includes socket descriptors respectively corresponding to the plurality of paths.

For example, when the one or more applications execute one system call, the one or more applications input the socket descriptors respectively corresponding to the plurality of paths to the transmit function. For example, the socket descriptors respectively corresponding to the plurality of paths are bound as an array and input to the transmit function. For another example, the one or more applications directly input the socket descriptors respectively corresponding to the plurality of paths to the transmit function.

During implementation, the one or more applications running in the operating system of the first device input the socket descriptors respectively corresponding to the plurality of paths to the transmit function such that the transmit function polls the socket descriptors, to write the data of the one or more applications to cache space indicated by the socket descriptors.

In a feasible design, the one or more applications execute one system call, and poll the socket descriptors respectively corresponding to the plurality of paths, to write the data to the cache space indicated by the socket descriptors. The operating system of the first device sends second acknowledgment information to the one or more applications, where the second acknowledgment information indicates that the operating system acknowledges that the data respectively corresponding to the one or more applications has been written to the cache space indicated by the socket descriptors respectively corresponding to the plurality of paths. For example, the one or more applications running in the operating system of the first device execute the system call to write the data of the one or more applications to the cache space corresponding to the socket descriptors of the paths, and the operating system of the first device detects whether data has been written to cache space indicated by each socket descriptor, and generates acknowledgment information for each socket descriptor. Acknowledgement information of all the socket descriptors forms the second acknowledgment information. Acknowledgement information of each socket is used to indicate whether data has been written to cache space indicated by the socket descriptor.

In this embodiment, the operating system of the first device sends the second acknowledgment information to the one or more applications, and the second acknowledgment information indicates that the operating system determines whether the data respectively corresponding to the one or more applications has been distributed to the paths such that the operating system of the first device manages each application.

In a feasible design, at least two of the plurality of paths belong to a same multipath connection.

For example, still referring to FIG. 2, in the paths 1 to 6, the paths 1 to 4 belong to a same multipath connection.

In this embodiment, because at least two of the plurality of paths belong to a same MP connection, in an MP connection implementation scenario, the application can write, through only one system call, data to cache space indicated by socket descriptors of a plurality of paths included in the MP connection.

Figure 7:
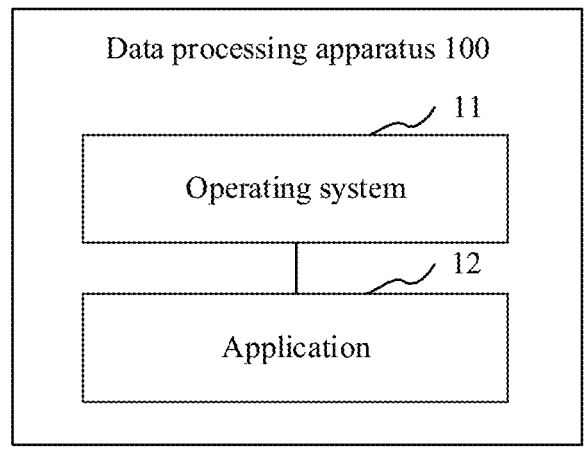
FIG. 7 is a schematic structural diagram of a data processing apparatus according to an embodiment of this application.

FIG. 7 is a schematic structural diagram of a data processing apparatus 100 according to an embodiment of this application. The apparatus is configured to process data on a plurality of paths, the plurality of paths are paths between a first device and a second device, the plurality of paths corresponds to one or more applications, the one or more applications run in an operating system of the first device, and the apparatus 100 includes an operating system 11 and an application 12. When the data processing apparatus 100 is configured to process data in a data receiving process, functions of the operating system 11 and the application 12 are as follows.

The operating system 11 is configured to receive packets on the plurality of paths, where the packets are from the second device.

The application 12 is configured to, after the operating system 11 receives the packets on the plurality of paths, obtain, through only one system call, data respectively corresponding to the one or more applications from data carried in the packets.

In a feasible design, the application 12 is configured to obtain, by calling a receive function only once, the data respectively corresponding to the one or more applications from the data carried in the packets, where the receive function is a system call interface, and the receive function is used to poll socket descriptors corresponding to two or more paths, to obtain data indicated by the socket descriptors corresponding to the two or more paths.

In a feasible design, input of the receive function includes socket descriptors respectively corresponding to the plurality of paths.

In a feasible design, the operating system 11 is further configured to send first acknowledgment information to the one or more applications, where the first acknowledgment information indicates that the operating system acknowledges that the data respectively corresponding to the one or more applications has been obtained by the one or more applications.

In a feasible design, at least two of the plurality of paths belong to a same multipath connection.

In a feasible design, the packets on the plurality of paths that are received by the operating system of the first device include at least two packets from a same path.

When the data processing apparatus 100 is configured to process data in the data receiving process, functions of the operating system 11 and the application 12 are as follows.

The application 12 is configured to correspondingly distribute data of the one or more applications to the plurality of paths through only one system call.

The application system 11 is configured to send the data to the second device over the plurality of paths.

In a feasible design, the application 12 is configured to correspondingly distribute the respective data of the one or more applications to the plurality of paths by calling a transmit function only once, where the transmit function is a system call interface, and the transmit function is used to poll socket descriptors corresponding to two or more paths, to distribute the data to cache space indicated by the socket descriptors corresponding to the two or more paths.

In a feasible design, input of the transmit function includes socket descriptors respectively corresponding to the plurality of paths.

In a feasible design, the operating system 11 is further configured to send second acknowledgment information to the one or more applications, where the second acknowledgment information indicates that the operating system acknowledges that the data respectively corresponding to the one or more applications has been written to cache space indicated by the socket descriptors respectively corresponding to the plurality of paths.

In a feasible design, at least two of the plurality of paths belong to a same multipath connection.

Figure 8:
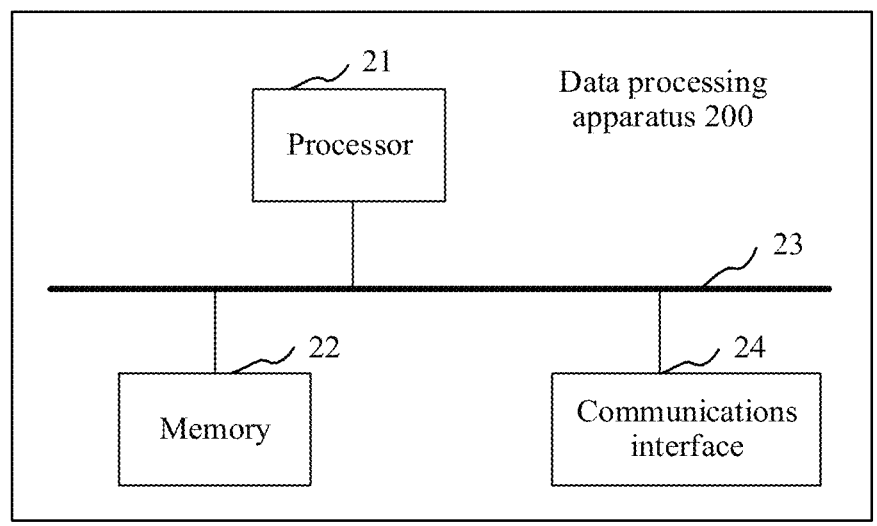
FIG. 8 is a schematic structural diagram of a data processing apparatus according to an embodiment of this application.

FIG. 8 is a schematic structural diagram of a data processing apparatus 200 according to an embodiment of this application. As shown in FIG. 8, the data processing apparatus 200 may include a processor 21 (for example, a CPU) and a memory 22. The memory 22 may include a high-speed random-access memory (RAM), and may further include a non-volatile memory (NVM) such as at least one disk memory. The memory 24 may store various instructions, to complete various processing functions and implement the method steps of this application.

Optionally, the data processing apparatus involved in this application may further include a communications bus 23 and a communications interface 24. The communications bus 23 is configured to implement a communication connection between elements, and the communications interface 24 is configured to implement connection and communication between the data processing apparatus and another peripheral device.

In this embodiment of this application, after each application is downloaded to a first device, an installation package of the application is stored in the memory 22. When the application is installed, the processor 21 processes the installation package stored in the memory 22 such that the application runs in an operating system of the first device. Alternatively, the application is an application included in the operating system, and can run in the operating system without being downloaded and installed. The operating system of the first device is stored in the memory 22. The operating system drives hardware using an instruction set of the hardware. The memory 22 is further configured to store computer executable program code, and the program code includes an instruction. When the processor 21 executes an instruction, the instruction enables the processor 21 of the data processing apparatus to execute a processing action of the first device in the foregoing embodiment or an optional embodiment. Implementation principles and technical effects of the instruction are similar to the foregoing descriptions, and details are not described herein again.

An embodiment of this application further provides a storage medium, the storage medium stores a computer execution instruction, and the computer execution instruction is used to implement the foregoing data processing method when being executed by a processor.

An embodiment of the present disclosure further provides a computer program product. When the computer program product runs on a first device, the first device is enabled to perform the foregoing data processing method.

A person skilled in the art should easily be aware that, in combination with the examples described in the embodiments disclosed in this specification, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the first device may be divided into functional modules based on the foregoing method examples. For example, each functional module corresponding to each function may be obtained through division, or two or more functions may be integrated into one processing module. The integrated module may be implemented in a form of hardware, or may be implemented in a form of a software functional module. It should be noted that, in the embodiments of this application, division into the modules is an example, is merely logical function division, and may be other division in actual implementation.

The term "a plurality of" in this specification means two or more. The term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates that associated objects are in an "or" relationship. In a formula, the character "I" indicates that associated objects are in a "division" relationship.

It may be understood that various reference numerals in the embodiments of this application are merely descriptions for convenient differentiation, and are not used to limit the scope of the embodiments of this application.

It may be understood that sequence numbers of the foregoing processes do not mean an execution sequence in the embodiments of this application. The execution sequence of the processes should be determined based on functions and internal logic of the processes, and should not be construed as any limitation on the implementation processes of the embodiments of this application.

It may be understood that in the embodiments of this application, the memory may be a non-volatile memory, such as a hard disk drive (HDD) or a solid-state drive (SSD), or may be a volatile memory, such as a RAM. The memory is any other medium that can be used to carry or store expected program code in a form of an instruction or a data structure and that can be accessed by a computer, but is not limited thereto. The memory in the embodiments of this application may be a circuit or any other apparatus that can implement a storage function, and is configured to store a program instruction and/or data.

The foregoing descriptions of implementations allow a person skilled in the art to understand that, for convenient and brief description, division into the foregoing functional modules is used as an example for illustration. In actual application, the foregoing functions may be allocated to and implemented by different functional modules based on a requirement. That is, an inner structure of an apparatus is divided into different functional modules to implement all or some of the functions described above.

In the several embodiments provided in this application, it should be understood that the disclosed apparatus and method may be implemented in other manners. For example, the described apparatus embodiments are examples. For example, division into the modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

All or some of the foregoing methods in the embodiments of this application may be implemented by software, hardware, firmware, or any combination thereof. When software is used to implement the embodiments, some or all of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, a first device, a terminal, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A data processing method comprising:
receiving, from a second device, packets on a plurality of paths between a first device and the second device, wherein the paths correspond to one or more applications run in the operating system; and
obtaining, by calling a receive function, data of the one or more applications in the packets,
wherein the receive function is a system call interface that accesses first socket descriptors corresponding to two or more paths to obtain the data,
wherein the data is indicated by the first socket descriptor, and
wherein a first input of the receive function comprises a total quantity of second socket descriptors corresponding to the paths.

2. The data processing method of claim 1, wherein a first second input of the receive function comprises the second socket descriptors corresponding to the paths.

3. The data processing method of claim 1, further comprising sending, by an operating system of the first device, first acknowledgment information to the one or more applications, wherein the first acknowledgment information indicates that the operating system acknowledges that the data has been obtained by the one or more applications.

4. The data processing method of claim 1, wherein at least two of the paths belong to a same multipath connection.

5. The data processing method of claim 1, wherein the packets comprise at least two packets from a same path.

6. The data processing method of claim 1, wherein the second device comprises a service server or a proxy server.

7. The data processing method of claim 1, wherein the first device and the second device exchange the data using a multipath transmission technology.

8. The data processing method of claim 1, wherein the first device and the second device exchange the data using a single-path transmission technology.

9. A data processing method comprising:
distributing data of one or more applications to a plurality of paths by calling a transmit function, wherein the paths correspond to the one or more applications and are located between a first device and a second device, wherein the one or more applications run in an operating system of the first device, wherein the transmit function is a system call interface that accesses first socket descriptors corresponding to two or more paths to distribute the data to a cache space indicated by the first socket descriptors, and wherein a first input of the transmit function comprises a total quantity of second socket descriptors corresponding to the paths; and
sending the data to the second device over the paths.

10. The data processing method of claim 9, wherein a first second input of the transmit function comprises the second socket descriptors corresponding to the paths.

11. The data processing method of claim 9, further comprising sending, by the operating system, acknowledgment information to the one or more applications, wherein the acknowledgment information indicates that the operating system acknowledges that the data corresponding to the one or more applications has been written to a second cache space indicated by second socket descriptors.

12. The data processing method of claim 9, wherein at least two paths belong to a same multipath connection.

13. A first terminal device comprising:
a memory configured to store instructions; and
a processor coupled to the memory, wherein the instructions cause the processor to be configured to:
receive, from a second terminal device, packets on a plurality of paths; and
obtain, by calling a receive function, data of one or more applications in the packets,
wherein the receive function is a system call interface that accesses first socket descriptors corresponding to two or more paths to obtain the data,
wherein the data is indicated by the first socket descriptor, and
wherein a first input of the receive function comprises a total quantity of second socket descriptors corresponding to the paths.

14. The first terminal device of claim 13, wherein a second input of the receive function comprises the second socket descriptors corresponding to the paths.

15. The first terminal device of claim 13, wherein the instructions further cause the processor to be configured to send, using an operating system of the first device, first acknowledgment information to the one or more applications, and wherein the first acknowledgment information indicates that the operating system acknowledges that the data has been obtained by the one or more applications.

16. The first terminal device of claim 13, wherein at least two of the paths belong to a same multipath connection.

17. The first terminal device of claim 13, wherein the packets comprise at least two packets from a same path.

18. The first terminal device of claim 13, wherein the second terminal device comprises a service server or a proxy server.

19. The first terminal device of claim 13, wherein the first terminal device and the second terminal device exchange the data using a multipath transmission technology.

20. The first terminal device of claim 13, wherein the first terminal device and the second terminal device exchange the data using a single-path transmission technology.

* * * * *

UNITED STATES PATENT AND TRADEMARK OFFICE
CERTIFICATE OF CORRECTION

PATENT NO. : 11,809,925 B2
APPLICATION NO. : 17/847525
DATED : November 7, 2023
INVENTOR(S) : Rahul Arvind Jadhav, K Anmol Mani Tejeswar Sarma and Zhen Cao It is certified that error appears in the above-identified patent and that said Letters Patent is hereby corrected as shown below:

In the Claims

Claim 2, Column 22, Line 50-51: "wherein a first second input" should read "wherein a second input"

Claim 10, Column 23, Line 18-19: "wherein a first second input" should read "wherein a second input"

Signed and Sealed this
Ninth Day of January, 2024

Katherine Kelly Vidal
*Director of the United States Patent and Trademark Office*